(12) United States Patent
Bartolome Rodriguez

(10) Patent No.: US 8,997,384 B2
(45) Date of Patent: Apr. 7, 2015

(54) WEAR ASSEMBLY FOR MACHINERY

(71) Applicant: Javier Bartolome Rodriguez, Molins De Rei (ES)

(72) Inventor: Javier Bartolome Rodriguez, Molins De Rei (ES)

( * ) Notice: Subject to any disclaimer, the term of this patent is extended or adjusted under 35 U.S.C. 154(b) by 121 days.

(21) Appl. No.: 13/748,853

(22) Filed: Jan. 24, 2013

(65) Prior Publication Data

US 2013/0185965 A1 Jul. 25, 2013

(30) Foreign Application Priority Data

Jan. 24, 2012 (EP) .................................... 12152335

(51) Int. Cl.
*E02F 9/28* (2006.01)
*B23P 19/00* (2006.01)

(52) U.S. Cl.
CPC ............... *E02F 9/2883* (2013.01); *B23P 19/00* (2013.01); *E02F 9/2825* (2013.01); *E02F 9/2833* (2013.01); *E02F 9/2841* (2013.01)

(58) Field of Classification Search
CPC ..... E02F 9/2841; E02F 9/2833; E02F 9/2825; E02F 9/2883
USPC ............ 37/446, 452–460, 450; 403/320, 316, 403/348, 380, 409.1, 379.4, 408.1; 172/772, 772.5, 762, 769; 411/349, 411/351, 549, 553
See application file for complete search history.

(56) References Cited

U.S. PATENT DOCUMENTS

| | | | |
|---|---|---|---|
| 4,918,843 A | 4/1990 | Kiesewetter et al. | |
| 5,469,648 A | 11/1995 | Jones et al. | |
| 5,913,605 A * | 6/1999 | Jusselin et al. | 37/451 |
| 5,983,534 A | 11/1999 | Robinson et al. | |
| 5,992,063 A * | 11/1999 | Mack | 37/450 |
| 7,640,685 B2 | 1/2010 | Emrich | |
| 7,707,755 B2 * | 5/2010 | Lopez Almendros et al. | 37/457 |
| 8,555,532 B2 * | 10/2013 | Lopez Almendros et al. | 37/456 |
| 2007/0000157 A1 | 1/2007 | Emrich | |

FOREIGN PATENT DOCUMENTS

| | | |
|---|---|---|
| WO | WO03048462 | 6/2003 |
| WO | WO2005095720 | 10/2005 |
| WO | WO2011125794 | 10/2011 |

OTHER PUBLICATIONS

International Application Status Report for PCT/JP2011/058123, report generated Jan. 21, 2013 issued WIPO, Geneva, Switzerland (abstract translated in English).
Extended European Search Report Application No. EP 12152335 issued by the European Patent Office, Munich, Germany, dated Jun. 27, 2012.

* cited by examiner

*Primary Examiner* — Robert Pezzuto
(74) *Attorney, Agent, or Firm* — Peter B. Scull; Hamilton, DeSanctis & Cha LLP

(57) ABSTRACT

Wear assembly for machinery includes wear and support elements and a retaining pin for attaching them to each other. The retaining pin has protrusions and the wear element has cavities such that the protrusions can be passed therethrough. The support element has a recess for receiving one of the protrusions. In a first position the retaining pin can be inserted into the wear and support elements. In a second position one protrusion is snap fitted in one cavity so the retaining pin cannot be rotated to the wear and support elements and the other protrusion is received into the recess abutting an inner surface of the wear element such that the retaining pin cannot be displaced axially to the wear and support elements.

17 Claims, 5 Drawing Sheets

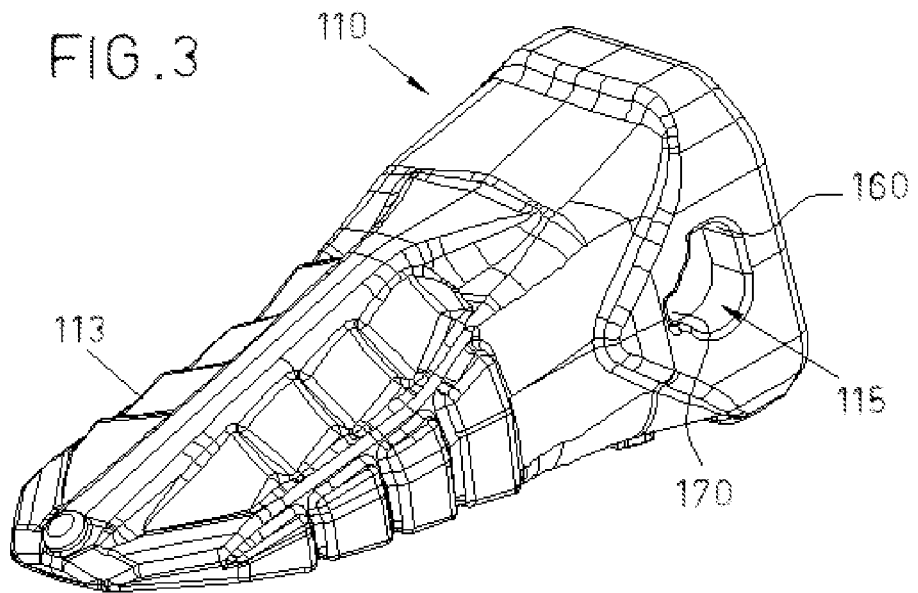
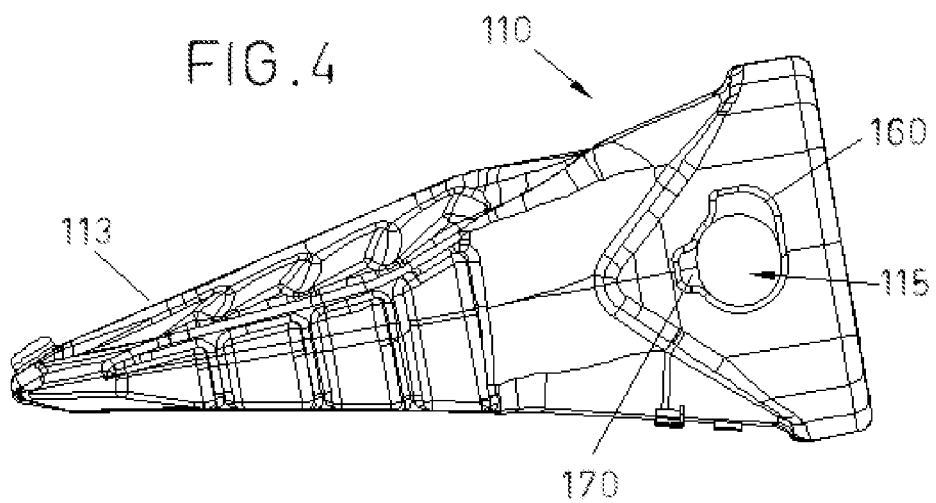

WEAR ASSEMBLY FOR MACHINERY

TECHNICAL FIELD

A wear assembly including a retaining pin, a wear element and a support element is herein disclosed. The wear assembly is particularly suitable for, but not limited to, any type of industrial machinery or equipment having parts subjected to wear.

A retaining pin for attaching a wear element and a support element to each other is also disclosed.

Furthermore, a wear element is also disclosed herein.

BACKGROUND

Wear assemblies are widely known in different types of industrial machinery or equipment such as, for example, excavating machinery, e.g. excavators, bulldozers, angle-dozers, mechanical shovels, shovel loaders, road rollers, tamping machines, dragline buckets, etc, and in general earth-moving equipment and material displacement machinery having parts subjected to wear.

It is known in the art to provide such industrial machinery or equipment with wear elements, also referred to as fingers, tips or tooth points. The wear elements are mechanically configured to engage and displace materials such as earth. In use, the wear elements are attached the machinery through a support element, also referred to as adapter. The support element or adapter can be engaged to or be part of the machinery itself.

Mutual attachment of wear elements and support elements in machinery is commonly carried out through corresponding retaining pins. The wear elements and the support elements attached through corresponding retaining pins form the respective wear assemblies.

The parts of the wear assembly, especially the wear elements, operate in harsh working conditions and they are subjected to very heavy loading and a high degree of wearing in use. The purpose of the wear elements is typically to protect the support element or parts of the machinery from premature wear. The wear elements wear out frequently and require periodic replacement. Therefore a quick and easy removal is required while ensuring that the wear elements and the support elements are securely mounted in order to withstand the considerable forces exerted on both elements during operation.

The configuration of retaining pin as well as the portion of the wear element and the support element where the retaining pin is received is of great importance. For attaching the wear elements to the corresponding support elements, the retaining pins are typically forcibly driven into aligned portions of the wear element and the support element. This is carried out by hitting a tool such as a sledge hammer or the like until the retaining pin has been properly inserted into the wear element and the support element. Detaching the wear element from the support element requires the corresponding retaining pin to be forcibly pounded out. This can give rise to a safety hazard for the operator in installing and removing operations. In addition, in such installing and removing operations the retaining pin may become deformed, so its extraction may become a difficult operation.

Document WO2011125794 discloses a retaining pin for attaching a wear element to a support element. Bushings, bolts, and washers are provided to prevent the retaining pin from falling off the wear element and the support element.

Document U.S. Pat. No. 4,918,843 also discloses a retainer pin assembly for attaching a wear element to a support element. The retainer pin assembly has a spring retainer, a retainer pin, and a holder.

Both solutions suffer from the disadvantage that several parts are necessary in combination with the retaining pin for attaching the wear element to the support element involving undesirably complexity and high costs.

Document WO2005095720 also discloses a retaining pin for attaching two mechanical parts to one another in a detachable manner. The retaining pin and the mechanical parts to be attached to each other are configured such that as the retaining pin is rotated it becomes locked (or unlocked). This is carried out by the provision of two or more inclined surfaces in conjunction with elastically loaded tension elements projecting in the axial direction of the pin.

Document U.S. Pat. No. 5,983,534 provides a lock structure for attaching a wear element to a support element. When the support element is received into the lock structure it can be axially inserted therein in a first rotational orientation and then forcibly rotated to a second rotational orientation. The wear and support elements have openings which surfaces are configured to radially inwardly displace a force exerting member in response to such rotation causing a continuous resilient force to be exerted to the elements tending to tighten them to each other. As the lock structure is rotated during its installation, a ramped surface on the support element permits it to snap into a retaining pocket thereon preventing further rotation of the lock structure.

These above solutions have the disadvantage that the provision of parts having inclined planes or surfaces configured in correspondence with tension elements renders the arrangement complex and therefore the whole assembly capital intensive.

A need still exists for an improved wear assembly in which parts involved therein can be easily, quickly and safely attached and detached, for example in maintenance and/or repair operations.

SUMMARY

A wear assembly including a retaining pin, a wear element and a support element is herein disclosed suitable for but not limited to industrial machinery or equipment. Further advantageous implementations thereof have been specified also herein.

A retaining pin for attaching a wear element to a support element to each other is also disclosed.

A wear element is also disclosed herein.

The wear element of the present wear assembly may correspond to the finger, tip or tooth point in machinery such as excavators, bulldozers, angle-dozers, mechanical shovels, shovel loaders, road rollers, tamping machines, dragline buckets, etc. Other similar machinery is not ruled out for the applications of the present wear assembly, retaining pin and wear element. In general, the support element may correspond to an adapter to be engaged to or be part of the machinery or equipment itself.

The wear element of the present wear assembly is made of wear-resistant material suitable for protecting the support element from premature wear.

In use, the wear element and the support element are attached to each other by a retaining pin.

The retaining pin includes, for example, a cylindrical body made, e.g. from a suitable resistant metal or metal alloy(s). The cylindrical body of the retaining pin may be either solid or hollow or at least partially solid or hollow as required. The cylindrical body of the retaining pin is shaped and sized to be suitably inserted into corresponding aligned openings formed both in the wear element and the support element. The retaining pin can be inserted through said openings such that the wear element and the support element are removably attached to each other.

The cylindrical body of the retaining pin may include at least first and second angularly and axially spaced retaining protrusions. The first and second retaining protrusions of the retaining pin protrude radially from the body of the retaining pin. The protruding distance of the retaining protrusions may be equal or different to each other. The protruding distance of the retaining protrusions may have any value suitable for the retaining protrusions to pass through said corresponding openings in the wear element and the support element.

The retaining protrusions of the retaining pin may be radially spaced at an angle ranging from about 90 to about 180° to each other. A relative angular displacement of about 90° between said protrusions is the most preferred implementation. However, protrusions arranged at a relative angular displacement of about 180° could be also provided if required. As indicated, the first and second retaining protrusions of the retaining pin may further be axially spaced to each other according to the configuration of the wear element and the support element.

It is envisaged that at least some of the retaining protrusions of the retaining pin may be formed as a unitary piece together with the body of the retaining pin itself. In preferred implementations, the first retaining protrusion may be resiliently mounted to the body of the retaining pin. This results in that the first retaining protrusion is allowed to be slightly moved along a line substantially perpendicular to the longitudinal axis of the body of the retaining pin. This may be carried out for example by providing an elastomer or a spring, or even both an elastomer and a spring, associated with the first retaining protrusion.

The opening formed in the wear element has at least first and second cavities formed radially therein. The first and second cavities of the opening formed in the wear element are sized, shaped and arranged such that both the first and second retaining protrusions of the retaining pin can be freely passed therethrough. More specifically, the wear element has at least a first cavity suitable for receiving the first retaining protrusion of the retaining pin and at least a second cavity suitable for receiving the second retaining protrusion of the retaining pin in a first angular position of the retaining pin. In said first angular position the retaining pin is allowed to be inserted freely into the respective aligned openings of the wear element and the support element. Therefore, insertion of the retaining pin into the wear element and the support element does not need significant force to be applied to the retaining pin. This is because the retaining pin is allowed to be freely inserted across of the openings of the wear element and the support element for attaching them to each other.

The retaining pin has to be fully inserted into the openings through said aligned openings of the wear element and the support element. Then, the retaining pin should be rotated into a second angular position. This results in that the first retaining protrusion leaves the first cavity of the wear element and becomes received into the second cavity of the wear element. In this second angular position, the retaining pin is locked against rotation when inserted into the wear element and the support element. This is made possible since the first retaining protrusion of the retaining pin is biased radially against the first cavity of the opening in the wear element. This is caused by the provision of the above mentioned elastomer or spring in the first retaining protrusion of the retaining pin.

During rotation of the retaining pin into the second angular position, the second retaining protrusion of the retaining pin slidingly rotates within an inner recess formed in the support wear element. When the retaining pin is in the above mentioned second angular position, the retaining pin is prevented from being displaced axially relative to the wear element and the support element. This is because the second retaining protrusion fitted in said inner recess abuts an inner surface of the wear element of the wear assembly.

The main advantage of this wear assembly is that there is no need for delivering impacts on the retaining pin when mounting the retaining pin for attaching the wear element to the support element. Therefore, the use of hammers or hitting tools is advantageously avoided. This results in that risks can be significantly reduced, especially in sites in which noise should be controlled such as mines and the like. The mutual attachment of the wear element and the support element by the retainer pin as described above renders the assembly highly secure, simple and cost effective.

In some implementations of the present wear assembly, the inner recess in the support wear element may be defined by a curved groove segment having substantially flat walls. In other implementations, a full circular inner recess could be provided defining a cylindrical shaped recess having flat bases. One flat base would be defined in the support element where the inner recess is formed and the other flat base would be defined by an inside wall of the wear element. The depth of the recess in the support element is suitable for at least partially receiving the second retaining protrusion of the retaining pin.

The provision of flat walls in the inner recess of the support element results in that the assembly is advantageous less complex and easier to manufacture thus involving a reduction of costs.

In some implementations, the support element may include a rotation limiting element for at least restraining the support element from being rotated relative to the wear element when in use, that is when the wear element is attached to the support element. Said rotation limiting element may include, for example, sets of two mutually parallel longitudinal ridges projecting from at least one of a top portion and a bottom portion of the support element. In particular implementations it is preferred that two mutually parallel longitudinal ridges are protruding from the top portion of the support element and additional two parallel longitudinal ridges are protruding from the bottom portion of the support element.

Still in further implementations, the rotation limiting element may further include a shaped tool receiving portion configured for receiving a corresponding projection formed inside the wear element. The shaped tool receiving portion may be provided at one side in a front wall of the support element.

The support element may be further provided with at least one stabilization plane. This at least one stabilization plane is configured for at least restraining the relative longitudinal movement of the wear element and the support element when in use. Two stabilization planes formed both on at least one of a top portion and a bottom portion of the support element is preferred.

A retaining pin suitable for attaching a wear element and support element to each other is also disclosed herein. The retaining pin may include a cylindrical body as stated above. One end of the retaining pin body, that is, a base thereof, may have a shaped tool receiving portion formed therein. Such shaped tool receiving portion may be, for example, a hexagonal shaped tool receiving portion for receiving a standard Allen-type tool for driving the retaining pin body into rotation. Other types of tools, such as a square head tool or even specially shaped head tools may alternatively be used for driving the retaining pin body into rotation.

The body of the retaining pin may have at least first and second angularly and axially spaced retaining protrusions as stated above. The retaining protrusions are suitably configured for at least restraining the axial displacement and the radial movement of the retaining pin depending on the angular position of the retaining pin, as it will be described further below. It is preferred that at least one of the retaining protrusions of the retaining pin is formed with substantially flat surfaces. One of the most preferred implementations is with at least the second retaining protrusion of the retaining pin formed with substantially flat surfaces. This would render the retaining pin suitably configured to better match the configuration of the inner recess in the support element.

A wear element is also disclosed. It may include an opening for receiving a retaining pin therein as defined above. This opening of the wear element may further include at least a first cavity and a second cavity. The first cavity of the opening of the wear element allows the first retaining protrusion of the retaining pin to be suitably received when inserting the retaining pin across the wear element when the retaining pin is in a first angular position. As stated above, in this first angular position, the retaining pin can be freely inserted through the respective aligned openings formed both in the wear element and the support element. On the other hand, the second cavity of the opening of the wear element allows the first retaining protrusion to be received therein when the retaining pin is in a second angular position. In this second angular position of the retaining pin, the retaining pin is locked against displacement and rotation (axial and radial displacements).

Additional objects, advantages and features of presently preferred implementations of the wear assembly and parts thereof will become apparent to those skilled in the art upon examination of the description, or may be learned by practice thereof.

BRIEF DESCRIPTION OF THE DRAWINGS

A particular implementation of a wear assembly, a retaining pin and a wear element for their use in machinery such as excavating machinery and the like will be described in the following by way of one or more non-limiting examples, with reference to the appended drawings, in which:

FIG. 3 is a perspective view of the wear element of the wear assembly shown in FIGS. 1 and 2;

FIG. 4 is an elevational view of the wear element shown in FIG. 3;

DETAILED DESCRIPTION OF IMPLEMENTATIONS

Figure 1:
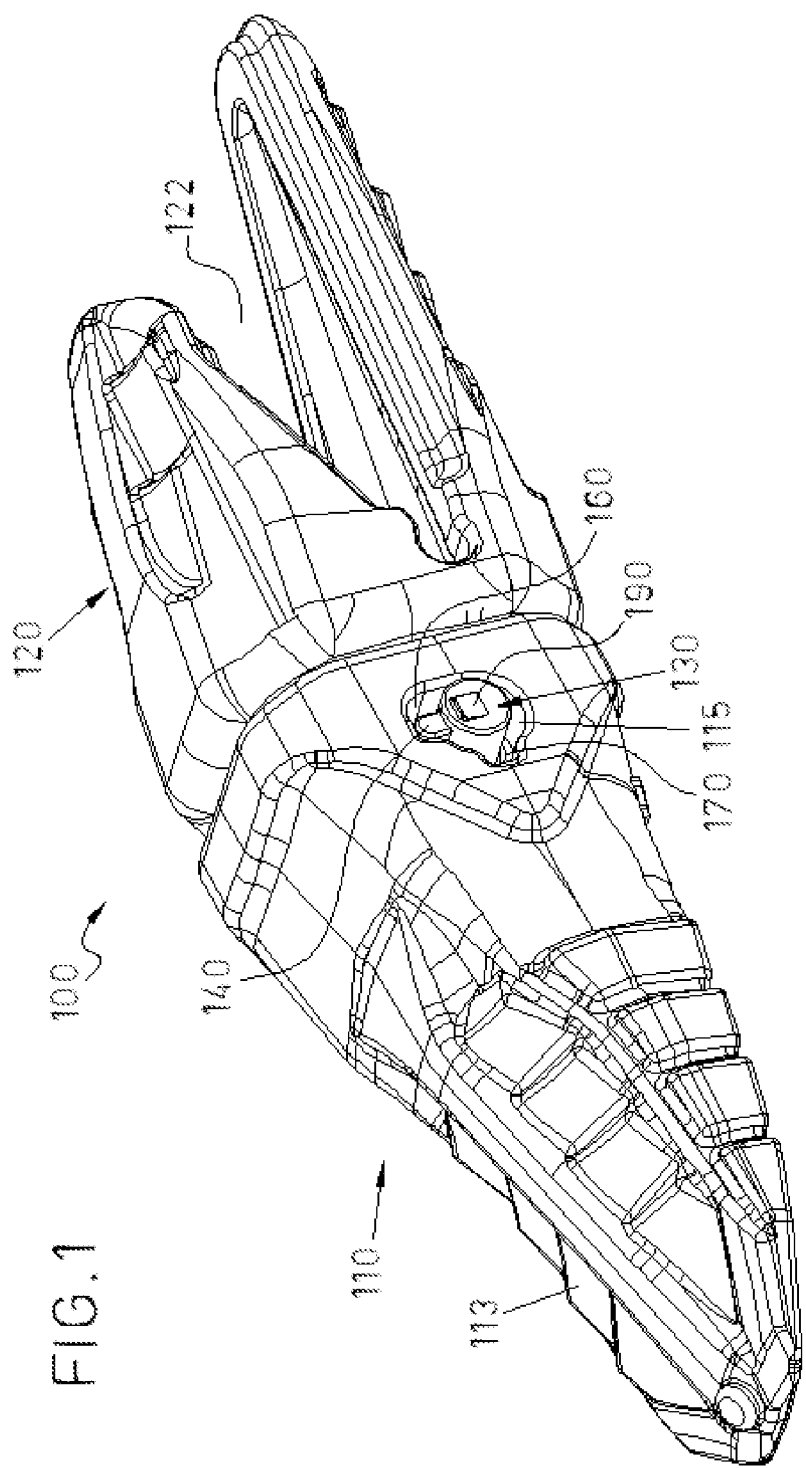
FIG. 1 is a general perspective view of one implementation of a wear assembly including a wear element and a support element attached to each other by a retaining pin.

The figures show a wear assembly indicated as a whole by reference numeral 100. The wear assembly 100 in the implementation shown is a part of a machine or equipment such as an excavator, bulldozer, angle-dozer, mechanical shovel, shovel loader, road roller, a tamping machine, dragline bucket, and material displacement machinery in general having parts subjected to wear and therefore to be replaced periodically.

The wear assembly 100 in the implementation shown includes a wear element 110. The wear element 110 is shown in detail in FIGS. 3 and 4 of the drawings. The wear element 110 as depicted corresponds to a finger, for example, a finger of an excavator bucket. The wear element 110 is made of a wear resistant material and has a leading surface 113 that is suitable for operations involving, e.g. impact on the ground, dragging soil, scrubbing dust, etc.

The wear assembly 100 further includes a support element 120. The support element 120 is shown in detail in FIGS. 5 and 6 of the drawings. The support element 120 is typically an adapter that is coupled, e.g. to the excavator bucket, through a receiving portion 122 in the rear portion of the support element 120.

In use, both the wear element 110 and the support element 120 are attached to each other by a retaining pin 130. The retaining pin 130 is shown in detail in FIGS. 7-8 of the drawings and it will be described further below.

Turning again to FIGS. 5 and 6 of the drawings in which the support element 120 is shown, a nose 123 is defined in the front portion of the support element 120. The nose 123 of the support element 120 is sized and shaped for being suitably received into a nose receiving portion (not shown) formed inside the wear element 110.

Figure 5:
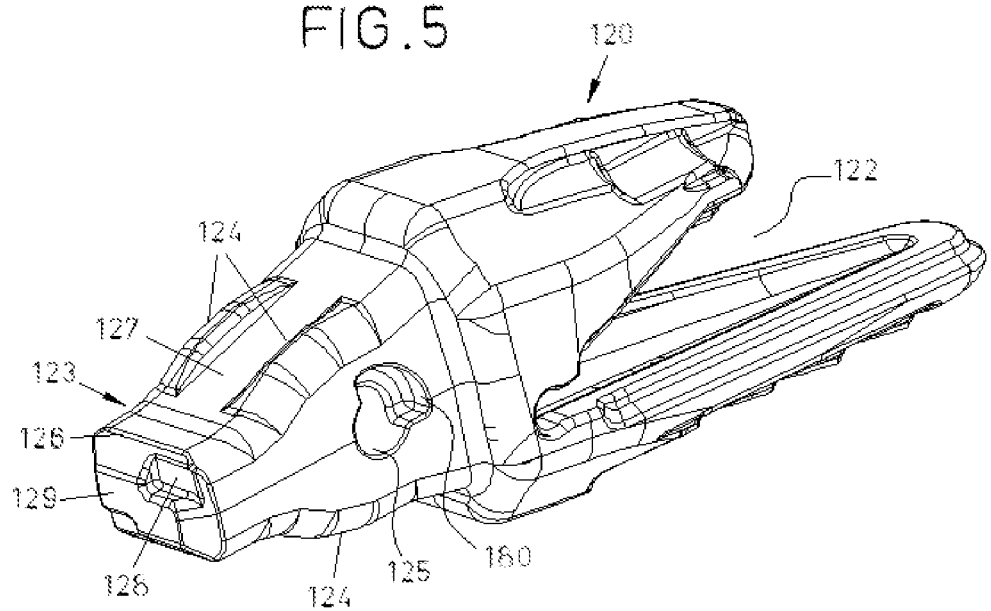
FIG. 5 is a perspective view of the support element of the wear assembly shown in FIGS. 1 and 2.
Figure 6:
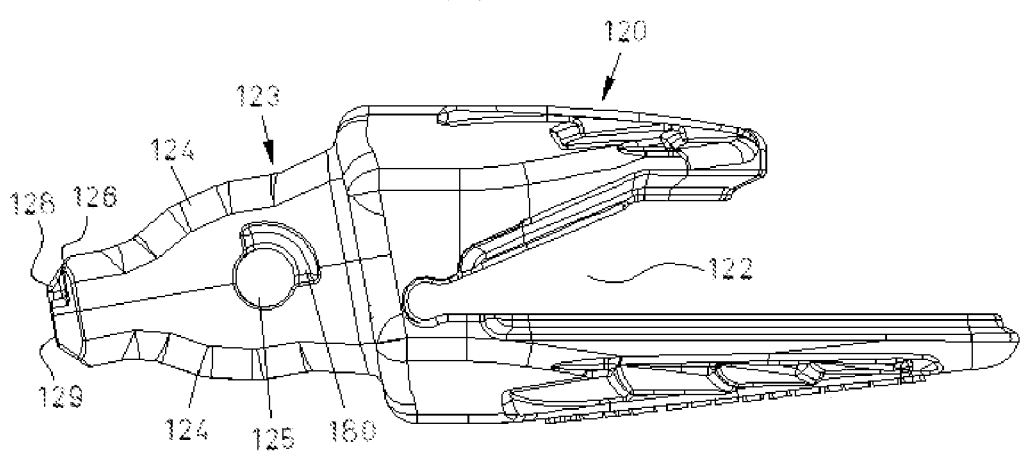
FIG. 6 is an elevational view of the support element shown in FIG. 5.

A first set of two mutually parallel longitudinal ridges 124 are provided in the nose 123 in the support element 120. The longitudinal ridges 124 are formed protruding from the leading surface 126 of the nose 123 as shown in FIGS. 5 and 6. The longitudinal ridges 124 may be also formed protruding from a bottom surface of the nose 123. The longitudinal ridges 124 are suitable for being fitted into the wear element 110 such that the support element 120 is prevented, or at least restrained, from being rotated relative to the wear element 110 when in use.

A recess 128 is also formed in one side of an upper portion of a front wall 129 in the nose 123 of the support element 120. The recess 128 is sized, arranged and shaped for receiving a corresponding projection (not shown) formed within the wear element 110.

The recess 128 together with the sets of longitudinal ridges 124 in the nose 123 of the support element 120 prevent, or at least restrain, the support element 120 from being rotated relative to the wear element 110 when in use.

Stabilization planes 127 are also defined both on the leading surface 126 and at the bottom portion of the nose 123. The stabilization planes 127 serve the purpose of avoiding, or at least restraining, the relative longitudinal movement of the wear element 110 and the support element 120 when subjected to forces in use. The configuration of the nose 123 with the longitudinal ridges 124, the stabilization planes 127 and the recess 128 reduces stress on the retaining pin 130 thus avoiding breaks or preventing the retaining pin 130 from being bent.

Figure 2:
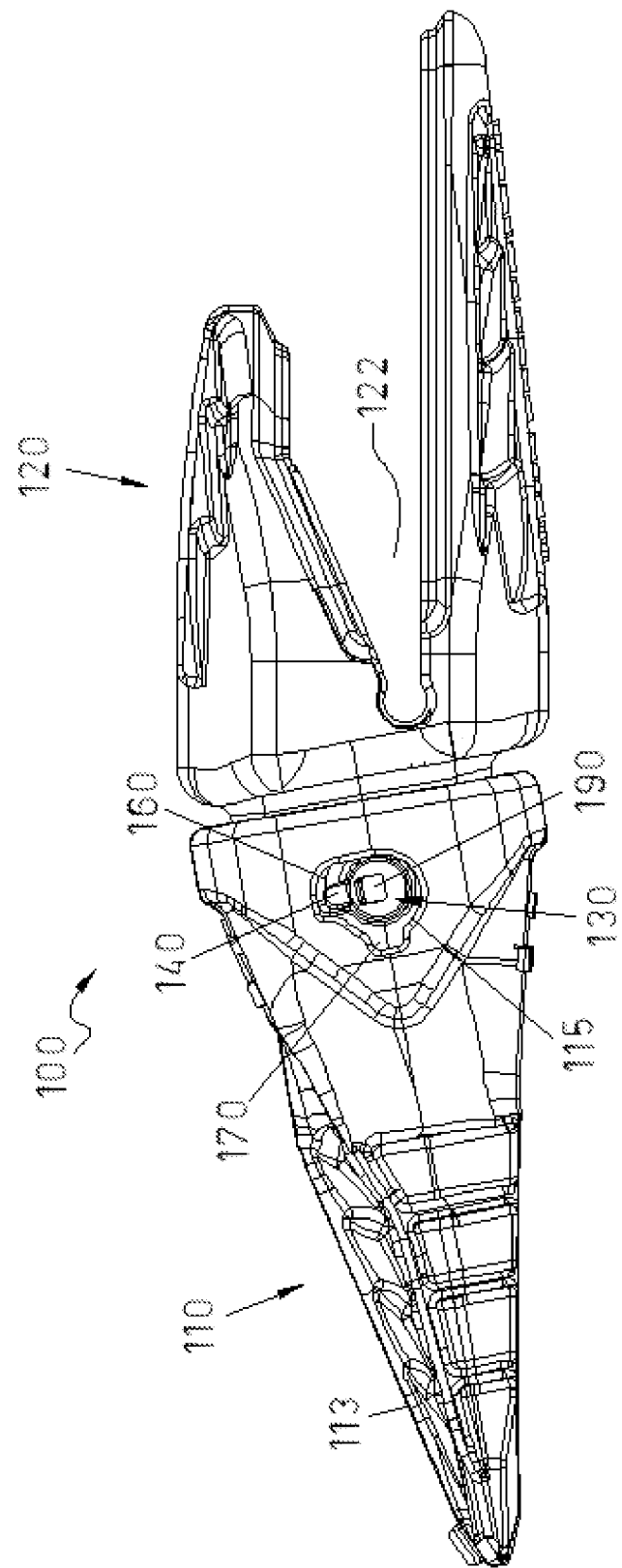
FIG. 2 is a general elevational view of the implementation of the wear assembly shown in FIG. 1.

When the wear assembly 100 is in use, that is with the wear element 110 and the support element 120 assembled and attached to each other, see FIGS. 1 and 2 of the drawings, the retaining pin 130 is fully inserted through the respective aligned openings 115, 125 of both the wear element 110 and the support element 120. The configuration of the openings 115, 125 of the wear element 110 and the support element 120, respectively, allow for an easy insertion and removal of the retaining pin 130 for attaching and detaching of the wear element 110 and the support element 120 to each other.

Figure 7:
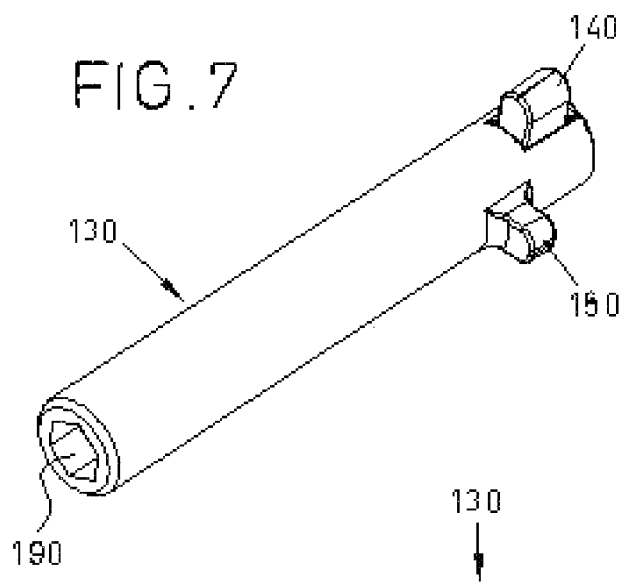
FIG. 7 is a perspective view of the one implementation of a retaining pin.
Figure 8:
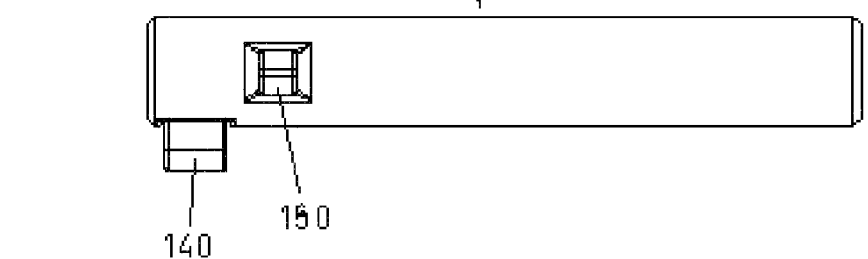
FIG. 8 is an elevational view of the retaining pin shown in FIG. 7.

Now referring to FIGS. 7 and 8 of the drawings, the retaining pin 130 includes an elongated cylindrical body. The elongated cylindrical body of the retaining pin 130 is preferably made of any suitable metal such as steel the length of which is substantially suitable for extending across both the wear element 110 and the support element 120.

The elongated cylindrical body of the retaining pin 130 includes a first retaining protrusion 140 and a second retaining protrusion 150. The retaining protrusions 140, 150 of the retaining pin 130 are formed with substantially flat surfaces. The retaining protrusions 140, 150 of the retaining pin 130 are angularly and axially spaced to each other as shown in FIGS. 7 and 8. In the implementation shown, the relative angular displacement of the retaining protrusions 140, 150 of the retaining pin 130 is about 90°. Of course, other arrangements of the retaining protrusions 140, 150 are possible. On the other hand, the relative axial displacement of the retaining protrusions 140, 150 in the retaining pin 130 in the particular implementation shown is reduced and may vary depending on the specific design of the wear element 110 and the support element 120.

Figure 9:
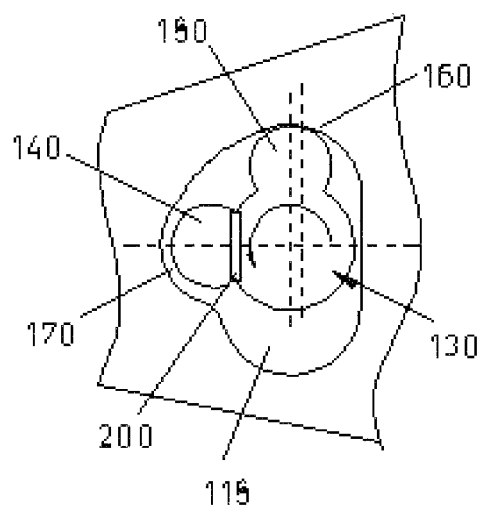
FIGS. 9 and 10 are diagrammatic views showing two different angular positions of the retaining pin within the wear assembly.
Figure 10:
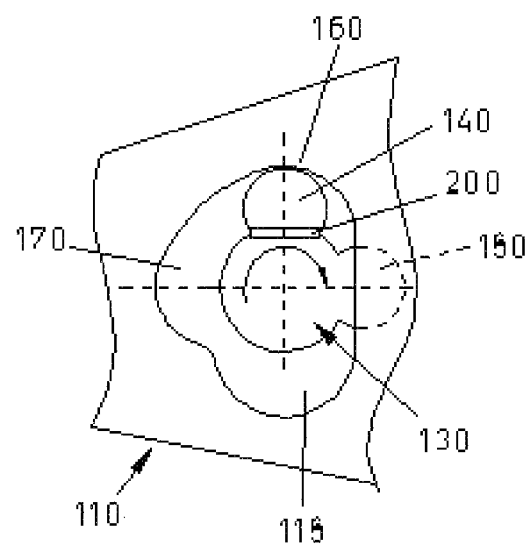

The recess 180 formed in the support wear element 120, as shown in FIGS. 5 and 6 of the drawings, is a curved groove segment having substantially flat walls. Recess 180 is suitable for receiving the second retaining protrusion 150 of the retaining pin 130. In use second retaining protrusion 150 of the retaining pin 130 is allowed to slide along the recess 180 as the retaining pin 130 is rotated for locking or unlocking the retaining pin 130. The angular length of the curved groove segment of the recess 180 determines the travel stroke of the second retaining protrusion 150 of the retaining pin 130. The angular length of the curved groove segment of the recess 180 therefore defines the rotational displacement of the retaining pin 130 from a first position, shown in FIG. 9, in which the retaining pin 130 can be moved freely axially for insertion into both the wear element 110 and the support element 120, to a second position, shown in FIG. 10, in which the retaining pin 130 is rotated about 90° (clockwise in the FIGS. 9 and 10) such that the second retaining protrusion 150 is fitted between the recess 180 and an inner surface of the wear element 110 and therefore the retaining pin 130 is prevented from being displaced axially relative to the wear element 110 and support element 120, and also prevented from being displaced radially as it will explained below.

In this implementation, the second protrusion 150 of the retaining pin 130 is formed as a unitary piece together with the body of the retaining pin 130. The first retaining protrusion 140 instead is resiliently mounted to the body of the retaining pin 130. In this particular implementation, the first retaining protrusion 140 is associated with an elastomer 200 fitted between the body of the retaining pin 130 and the first retaining protrusion 140. This allows the first retaining protrusion 140 to be slightly moved along a line substantially perpendicular to the longitudinal axis of the body of the retaining pin 130.

The opening 115 of the wear element 110 has a first cavity 160 and a second cavity 170 formed therein. The first cavity 160 and the second cavity 170 of the opening 115 formed in the wear element 110 are arranged at an angle of about 90° to each other as shown in the figures. The arrangement of the first and second cavities 160, 170 may be other than the above mentioned arrangement at an angle of about 90° to each other as long as it corresponds with the angular arrangement of the first and second retaining protrusions 140, 150 of the retaining pin 130.

The particular arrangement of the first and second cavities 160, 170 allows the retaining pin 130 to be easily inserted into both the wear element 110 and the support element 120 in the first angular position of the retaining pin 130 as explained above. More specifically, the first and second retaining protrusions 140, 150 of the retaining pin 130 can be easily passed through said the first and second cavities 160, 170 of the opening 115 formed in the wear element 110. The first cavity 160 is suitable for receiving the first retaining protrusion 140 of the retaining pin 130 and the second cavity 170 is suitable for receiving the second retaining protrusion 150 of the retaining pin 130 in said first position.

As stated above, when the retaining pin 130 is in the first angular position, it is allowed to be inserted into the respective openings 115, 125 of the wear element and the support element 110, 120 with no significant force. Then, the retaining pin 130 should be fully inserted into the openings 115, 125 of the wear element 110 and the support element 120. This occurs when the second retaining protrusion 150 of the retaining pin 130 has been positioned beyond the side wall of the wear element 110 and received into the recess 180 formed in the support element 120. In this situation in which the retaining pin 130 is fully inserted into the openings 115, 125 of the wear element 110 and with the retaining pin 130 is in said first angular position, the retaining pin 130 has to be rotated, for example by using a tool having a head to be inserted into a tool receiving portion 190 formed at one or both ends of the retaining pin 130. The tool receiving portion 190 may be hexagonal in shape for receiving a standard Allen-type tool for driving the retaining pin 130 into rotation. Other types of tools, such as square head tool or even specially shaped head tools may alternatively used for driving the retaining pin 130 into rotation. Through the use of such tool (not shown) the retaining pin 130 can be rotated from said first position into the second angular position. When driving the retaining pin 130 into rotation through an angle of about 90° the first retaining protrusion 140 of the retaining pin 130 leaves the first cavity 160 of the wear element 110 and becomes received into the second cavity 170 of the wear element 110. In this second angular position of the retaining pin 130, the retaining pin 130 is locked against rotation. This is made possible since the first retaining protrusion 140 of the retaining pin 130 is biased radially against an inner surface of the first cavity 160 by the elastomer 200 as described above. The hardness of the elastomer 200 will be chosen for both allowing the snap fitting of the first retaining protrusion 140 of the retaining pin 130 in the first cavity 160 of the wear element 110 and preventing the retaining pin 130 from being rotated relative to the wear element 110 and support element 120. Locking of the retaining pin 130 is achieved due to the particular shape and size of the first cavity 160, smaller than the first retaining protrusion 140 of the retaining pin 130. When the first retaining protrusion 140 of the retaining pin 130 is fitted into the first cavity 160 of the wear element 110, the first retaining protrusion 140 is moved to the body of the retaining pin 130 and the elastomer 200 is pressed down. This results in that the retaining pin 130 becomes locked against rotation in this second position.

Although only a number of particular implementations and examples of a wear assembly, retaining pin and a wear element have been disclosed herein, it will be understood by those skilled in the art that other alternative implementations and/or uses and obvious modifications and equivalents thereof are possible. For example, although the first retaining protrusion 140 has been disclosed as being resiliently mounted to the retaining pin 130, it would be possible, for example, that both retaining protrusions 140, 150 are formed integrally with the retaining pin 130. In this case the elastomer would be associated with the first cavity 160 of the wear element 110. The first cavity 160 would be provided with a biasing portion configured for radially biasing the second retaining protrusion 150 when fitted in the first cavity 160 of the wear element 110. This similarly would cause the first retaining protrusion 140 of the retaining pin 130 to be snap fitted in the first cavity 160 of the wear element 110 resulting in that the retaining pin 130 is locked against rotation relative to the wear element 110 and the support element 120 when the retaining pin 130 is in said second position.

The claims cover all possible combinations of the particular implementations described. Reference signs related to drawings and placed in parentheses in a claim are solely for attempting to increase the intelligibility of the claim, and shall not be construed as limiting the scope of protection. Thus, the scope of protection should not be limited by the particular implementations, but should be determined only by a fair reading of the claims that follow.

What is claimed is:

1. A wear assembly for machinery, the assembly comprising a wear element, a support element, each comprising respective openings, and a retaining pin that can be received into said respective openings for attaching the wear element and the support element to each other, wherein:
    the retaining pin has at least first and second angularly and axially spaced retaining protrusions at least one of which is formed as a unitary piece together with the retaining pin, and wherein the first retaining protrusion is resiliently mounted relative to the retaining pin;
    the opening of the wear element has at least first and second cavities such that both the first and second retaining protrusions of the retaining pin can be passed therethrough, and
    the opening of the support element has at least one inner recess for further receiving the second retaining protrusion of the retaining pin at least partially therein,
    wherein the wear element is configured to be inserted into the support element along a single, longitudinal direction of movement until at least one end portion of the support element is inserted into the wear element such that the openings of the wear element and the support element are aligned with each other for receiving the retaining pin,
    such that
        in a first, angular position of the retaining pin the retaining pin can be inserted both into the wear element and the support element when said elements are attached to each other, and
        in a second, angular position of the retaining pin, and once the retaining pin is inserted in both the wear element and the support element, the first retaining protrusion of the retaining pin is snap fitted in the first cavity of the wear element such that the retaining pin is prevented from being rotated relative to the wear element and the element and the second retaining protrusion of the retaining pin is received into the inner recess of the support element abutting an inner surface of the wear element such that the retaining pin is prevented from being displaced axially relative to the wear element and the support element when both elements are attached to each other.

2. A wear assembly as claimed in claim 1, wherein the inner recess in the support element is defined by a curved groove segment having substantially flat walls.

3. A wear assembly is claimed in claim 1, wherein the inner recess in the support element is cylindrical in shape.

4. A wear assembly as claimed in claim 1, wherein the first and second retaining protrusions are arranged in the retaining pin spaced at an angle ranging from about 90 to about 180° to each other.

5. A wear assembly as claimed in claim 1, wherein the first retaining protrusion comprises an elastomer.

6. A wear assembly as claimed in claim 1, wherein the first retaining protrusion comprises a spring.

7. A wear assembly as claimed in claim 1, wherein the first retaining protrusion is fixedly mounted to the retaining pin and the first cavity of the wear element is provided with a biasing portion configured for radially biasing the first retaining protrusion when fitted in the first cavity of the wear element.

8. A wear assembly as claimed in claim 1, wherein the support element comprises a rotation limiting element suitable for at least restraining the support element from being rotated relative to the wear element when the wear element is attached to the support element.

9. A wear assembly as claimed in claim 8, wherein the rotation limiting element comprises longitudinal ridges projecting from at least one of a top portion and a bottom portion of the support element suitable for being fitted into the wear element.

10. A wear assembly as claimed in claim 8, wherein the rotation limiting element comprises a recess configured for receiving a corresponding projection of the wear element.

11. A wear assembly as claimed in claim 1 wherein the support element further comprises at least one stabilization plane for at least restraining the relative longitudinal movement of the wear element and the support element.

12. A wear assembly as claimed in claim 11, wherein the stabilization planes are formed both on at least one of a top portion and a bottom portion of the support element.

13. A retaining pin for attaching a wear element and a support element to each other as claimed in claim 1, the retaining pin having at least first and second angularly and axially spaced retaining protrusions at least one of which is formed as a unitary piece together with the retaining pin, and wherein the first retaining protrusion is resiliently mounted relative to the retaining pin, the retaining protrusions being configured for restraining the axial displacement and the radial movement of the retaining pin, wherein said retaining protrusions are formed with substantially flat surfaces.

14. A wear element comprising an opening for receiving a retaining pin as claimed in claim 13, wherein it further comprises at least a first cavity for receiving the first retaining protrusion of the retaining pin and at least a second cavity for receiving the second retaining protrusion of the retaining pin such that in a first, unlocked angular position of the retaining pin the retaining pin allowed to be inserted into the wear element, and in a second, locked angular position of the retaining pin the first retaining protrusion of the retaining pin is snap fitted in the first cavity of the first wear element such that the retaining pin is prevented from being rotated relative to the wear element.

15. A wear element as claimed in claim 14 wherein the wear assembly is one or more of a finger, tip or tooth point in machinery of one or more of an excavator, bulldozer, angledozer, mechanical shovel, shovel loader, road roller, tamping machine, and a dragline bucket.

16. A combination comprising:
   machinery and
   a wear assembly connected to the machinery, the wear assembly comprising:
      a wear element;
      a support element; and
      a retaining pin for attaching the wear element and the support element to each other,
   wherein:
      the retaining pin has at least first and second angularly and axially spaced retaining protrusions at least one of which is formed as a unitary piece together with the retaining pin, and wherein the first retaining protrusion is resiliently mounted relative to the retaining pin;
      the wear element has an opening having at least first and second cavities such that both the first and second retaining protrusions of the retaining pin can be passed therethrough, and
      the support element has an opening having at least one inner recess for further receiving the second retaining protrusion of the retaining pin at least partially therein.

17. A wear assembly for machinery, the assembly comprising a wear element, a support element, and a retaining pin for attaching the wear element and the support element to each other, wherein:
   the retaining pin has at least first and second angularly and axially spaced retaining protrusions;
   the wear element has at least first and second cavities such that both the first and second retaining protrusions of the retaining pin can be passed therethrough, and
   the support element has at least one inner recess for further receiving the second retaining protrusion of the retaining pin at least partially therein,
   wherein the support element comprises a rotation limiting element suitable for at least restraining the support element from being rotated relative to the wear element when the wear element is attached to the support,
   wherein one or both:
      the rotation limiting element comprises longitudinal ridges projecting from at least one of a top portion and a bottom portion of the support element suitable for being fitted into the wear element, and/or
      wherein the rotation limiting element comprises a recess configured for receiving a corresponding projection of the wear element;
   such that
      in a first, angular position of the retaining pin the retaining pin can be inserted both into the wear element and the support element when said elements are attached to each other, and
      in a second, angular position of the retaining pin, and once the retaining pin is inserted in both the wear element and the support element, the first retaining protrusion of the retaining pin is snap fitted in the first cavity of the wear element such that the retaining pin is prevented from being rotated relative to the wear element and the element and the second retaining protrusion of the retaining pin is received into the inner recess of the support element abutting an inner surface of the wear element such that the retaining pin is prevented from being displaced axially relative to the wear element and the support element when both elements are attached to each other.

* * * * *